Patented July 25, 1944

2,354,588

UNITED STATES PATENT OFFICE 2,354,588

DYESTUFF

Frank W. Gainey, Buffalo, N. Y., assignor to Allied Chemical & Dye Corporation, a corporation of New York No Drawing. Application September 30, 1941, Serial No. 413,046

17 Claims. (Cl. 260—208)

This invention relates to the improvement of dischargeable azo dyestuffs which ordinarily contain, as a result of the manufacture of said dyestuffs, impurities that stain materials dyed therewith thereby producing dull or off-color dyeings. It relates more particularly to the improvement of dischargeable azo dyestuffs containing impurities which stain or discolor discharges of said dyes, whereby the adverse effects of said impurities on the brightness of dyeings made with said dyestuffs and on discharges thereof are overcome.

Dischargeable azo dyestuffs which give white discharges by reduction, as upon treatment with formaldehyde-sulfoxylate, are used for dyeing natural and artificial fibers; such as textile materials made of vegetable fibers, artificial silk fibers, or natural or weighted silk fibers, or of mixtures of these fibers. These dyestuffs often contain, as a result of the manufacture of the dyestuff, impurities which stain the fibers and which are not discharged completely. Such impurities stain the discharged areas and cause dulling of undischarged dyeings made with the dyestuffs.

In the past the art has had but indifferent success in overcoming the difficulty of obtaining pure white discharges on materials dyed with dischargeable azo dyestuffs. For this purpose either the amounts of reducing ingredients of the discharge pastes have been increased or costly methods of purifying the dyestuffs have been employed.

By the process of this invention the presence of said impurities in the dyestuffs is obviated or rendered innocuous, brighter dyeings with the direct dyestuffs are obtained and, when the dyeings are discharged, discharges are obtained which are clearer, brighter and purer "whites."

According to the present invention these improvements are brought about by the treatment of the dischargeable azo dyestuff, and especially one which gives a white discharge, with a small amount of a substance which is a mordant for basic dyes, herein referred to as a "basic dye mordant." Examples of such substances are tannic acid, other tanning agents, and the water-soluble condensation products of sulfur with a phenol or an aromatic amine, known commercially as "Katanols"; e. g., "Katanol O," "Katanol N," and "Katanol W" (see Colour Index, page 357; Melliands Textileberichte (1930), page 612; German Patent 358,530; German Patent 446,219; Textil Hilfsmittel-Tabellen, Hetzer, 2nd ed., pages 147 to 148). Tannic acid and "Katanols" are preferred.

The treatment may be carried out in any of a number of ways. For example, the basic dye mordant may be added in small amounts to an aqueous solution of the dyestuff, such as a separately prepared solution or a solution produced in connection with the manufacture of the dyestuff, and the resulting solution may be filtered or otherwise separated from the precipitate of impurities which forms, after which the dyestuff may be recovered in a purified form from the solution. Preferably the proportion of dyestuff to solution is such that the solution is nearly saturated at the temperature of the treatment.

In accordance with other procedures, the basic dye mordant may be added to the dye bath itself prior to the dyeing treatment or it may be mixed in the dry form with the dyestuff and sold as such. According to the first treatment, the undesirable impurities in the dyestuff which cause a degradation of the discharge and/or a dullness of the dyeings are removed from the dyestuff. According to the second and third procedures, the impurities are converted in the dye bath to insoluble forms which have no affinity for the material being dyed, and which do not interfere with the dyeing and/or discharging of the dyestuff and are not altered by the dyeing and/or discharging operations; so that even though a precipitate of the impurities is formed in the dye bath it has no effect upon the dyeing of the fiber and is removed in the usual washing or soaping treatment following the dyeing.

A beneficial but not essential modification of the process of the invention involves adding a small amount of a decolorizing carbon to the solutions shortly after the addition of the basic dye mordant and before the filtration of the color solution. Any of the marketed grades of decolorizing carbon, for example the commercial product known as "Norit," is satisfactory.

The treatment is not restricted with respect to the nature of the dischargeable azo dyestuff and the type of solution or dye bath in which the treatment is carried out. Thus, the treatment of this invention is applicable to dischargeable azo dyestuffs of various types, and especially azo dyestuffs which are direct dyes for cotton and related fibers or which are acid dyes for silk and related fibers; and it may be carried out in acid, neutral and alkaline solutions and dye baths.

The amount of basic dye mordant to be employed varies within wide limits, depending on the particular dyestuff being treated. In general, an amount is used sufficient to overcome the harmful effect of the impurities. In some cases as little as 1 per cent, or even a fraction of a per cent, of the basic dye mordant, based on the weight of the dyestuff being treated, is sufficient. In other cases, as high as 20 per cent of the basic dye mordant, based on the weight of the dyestuff being treated, may be required. Usually an amount of basic dye mordant corresponding to 5 to 15 per cent of the weight of the dyestuff being treated produces satisfactory results.

The treatment in aqueous solution is advantageously carried out at an elevated temperature; e. g., a temperature above 50° C., and preferably between 75° C. and the boiling point of the solution.

The invention will be illustrated by the following specific examples of the treatment of various dischargeable azo dyestuffs, in which parts are by weight and temperatures are in degrees centigrade. Where dyeing formulas are given, the per cent of each of the ingredients is the weight per cent based on the weight of material to be dyed. The volume ratio indicated is the ratio of the weight of material to be dyed to the total weight of the bath. The weight of the bath indicated by this ratio is made up by adding water to the ingredients given.

*Example 1.*—A batch of Erie Black GX00 (Color Index No. 581) is made in the usual manner by combining tetrazotized benzidine with H acid in acid suspension, then with diazobenzene and finally with meta-phenylene diamine, in an alkaline aqueous medium. At the end of the reaction, a freshly made batch which has a volume of about 20,000 liters contains about 900 kilograms of the dyestuff, which is partially in solution, and partially in suspension in the alkaline aqueous medium in which the last combination was made. The batch also contains the organic impurities which have resulted from the slight excesses and decomposition products of the several intermediates which have entered into combination to make the dye. To this freshly made batch 60 to 90 kilograms of tannic acid are added (an amount equal in weight to about one part per 10 to 15 parts of dyestuff in the batch). The whole mass is stirred and heated, for example, to between 90° and 100°, until the dyestuff is in solution. The undesirable organic impurities apparently combine with the tannic acid and form insoluble compounds which remain suspended in the aqueous dye solution. The batch is agitated thereafter for about two hours and filtered. The filter cake of insolubles is washed with hot water to remove adhering dye solution, if desired; and the filtrate is treated in the usual manner (i. e., cooled, salted, neutralized, etc., and filtered) to isolate the dyestuff therefrom. The dyestuff thus obtained, when dyed on textile material and discharged in the usual manner (i. e., by printing with sodium formaldehyde-sulfoxylate followed by the usual aftertreatment) yields whites which are clearer, purer and brighter than those obtained from similar dyeings made with the untreated Erie Black GX00.

In place of the tannic acid used in the above example, "Katanol W," "Katanol N" and "Katanol O" may be used.

*Example 2.*—Two sets of dye baths are made up according to the following formulas A and B with each of the dyestuffs:

Erie Brilliant Black S (C. I. 581)
Erie Black GX00 and three sets of dye baths are made up according to the following formulas C, D, and E with each of the dyestuffs:

Erie Scarlet B (C. I. 382)
Erie Garnet B (C. I. 375)
Erie Fast Brown 3RB (C. I. 420)
Solantine Red 8BL (C. I. 278)
Erie Fast Orange CG (C. I. 621)
Solantine Brown BRL
Solantine Yellow 4GL
Solantine Orange 4G Conc.

Rayon is dyed therewith at 90° for one hour using a volume of dye bath of 1:35.

| A | B |
|---|---|
| 6% dyestuff<br>40% common salt<br>0.3 to 0.9% tannic acid | 6% dyestuff<br>40% common salt |

| C | D | E |
|---|---|---|
| 4% dyestuff<br>20% common salt<br>0.2% tannic acid | 4% dyestuff<br>20% common salt<br>0.2% "Katanol W" | 4% dyestuff<br>20% common salt |

Each of the dyeings is then printed with the following discharge paste:

| | Parts |
|---|---|
| Sodium formaldehyde-sulfoxylate | 15 |
| Water | 35 |
| Gum tragacanth solution (6%, i. e., 6 parts gum tragacanth per 100 parts solution) | 50 |
| Total | 100 |

The prints are then aged for five minutes at 102°, washed and dried.

The white discharges obtained on the goods dyed with dyestuffs to which tannic acid or "Katanol W" has been added are superior to those obtained with dyestuffs to which neither tannic acid nor "Katanol W" has been added.

*Example 3.*—Two sets of dye baths are made up according to the following formulas F and G with each of the dyestuffs Erie Brilliant Black S and Erie Black GX00. Tin-weighted silk is dyed therewith at 80° for 1 hour using a volume of dye bath of 1:40:

| F | G |
|---|---|
| 9% dyestuff<br>30% Glauber's salt<br>10% common salt<br>0.45 to 1.35% tannic acid | 9% dyestuff<br>30% Glauber's salt<br>10% common salt |

Each of the dyeings is then printed with the discharge paste employed in Example 2, aged for five minutes at 102°, washed and dried. As in the case of Example 2, the discharges obtained on the goods dyed with dyestuffs to which tannic acid has been added are superior to those obtained with dyestuffs to which tannic acid has not been added.

*Example 4.*—Two sets of dye baths are made up according to the following formulas H and I with each of the dyestuffs employed in Example 3. Pure silk is dyed therewith at 85° for 1 hour using a volume of dye bath of 1:40:

| H | I |
|---|---|
| 6% dyestuff<br>15% Glauber's salt<br>3% acetic acid (28% strength)<br>0.3 to 0.9% tannic acid | 6% dyestuff<br>15% Glauber's salt<br>3% acetic acid (28% strength) |

Each of the dyeings is then printed with the discharge paste employed in Example 2, aged for five minutes at 102°, washed and dried. As in the case of Example 2, the discharges obtained on the goods dyed with dyestuffs to which tannic acid has been added are superior to those obtained with dyestuffs to which tannic acid has not been added.

*Example 5.*—Two sets of dye baths are made up according to the following formulas J and K with each of the dyestuffs Diazine Bordeaux 2BL and Diazine Scarlet 2BL. Rayon is dyed therewith at 90° for 1 hour using a volume of dye bath of 1:35:

| J | K |
|---|---|
| 4% dyestuff<br>20% common salt<br>0.2 to 0.6% tannic acid | 4% dyestuff<br>20% common salt |

The material is then rinsed in cold water and diazotized for 20 minutes in a cold bath of Per cent
Sodium nitrite _____ 3
Sulfuric acid (66° Bé.) _____ 5 having a volume of 1:35, rinsed well, and developed for 20 minutes in a cold bath of Per cent
Beta-naphthol _____ 1
Caustic soda (77° Tw.) _____ ½ having a volume of 1:35, rinsed, and dried.

When discharge printed as described in Example 2, dyeings produced with the dye baths containing tannic acid yield discharges which are purer white than the dyeings obtained in the absence of tannic acid.

*Example 6.*—Two sets of dye baths are made up according to the following formulas L and M with each of the dyestuffs employed in Example 5:

| L | M |
|---|---|
| 3% dyestuff<br>30% Glauber's salt<br>0.15 to 0.45% tannic acid | 3% dyestuff<br>30% Glauber's salt |

Pure silk is dyed therewith for 1 hour at 85° using a volume of dye bath of 1:40, rinsed in cold water, and diazotized for 20 minutes in a cold bath of Per cent
Sodium nitrite _____ 3
Sulfuric acid (66° Bé.) _____ 5 having a volume of 1:40, rinsed in cold water, and developed for 20 minutes in a cold bath of Per cent
Beta-naphthol _____ 1
Caustic soda (77° Tw.) _____ ½ having a volume of 1:40, rinsed, and dried.

Each of the dyeings is then printed with the discharge paste employed in Example 2, aged for five minutes at 102°, washed and dried. As in the case of Example 2, the discharges obtained on the goods dyed with dyestuffs to which tannic acid has been added are superior to those obtained with dyestuffs to which tannic acid has not been added.

The same results are obtained by mixing the tannic acid with the dyestuffs employed in Examples 2, 3, 4, 5, and 6 in the form of the dry powders in the amounts set out in the examples, and using the resulting mixtures for the preparation of dye baths in accordance with above formulas B, G, I, K and M (employing the dry mixture as the dyestuff component of the formula).

*Example 7.*—Three sets of dye baths are made up according to the following formulas N, O, and P with each of the dyestuffs:

Erie Scarlet B
Erie Garnet B
Erie Fast Brown 3RB
Solantine Red 8BL
Solantine Brown BRL
Solantine Yellow 4GL
Solantine Orange 4G Conc.

Cotton is dyed therewith at 95° for 1 hour using a volume of dye bath of 1:30:

| N | O | P |
|---|---|---|
| 4% color<br>0.2% tannic acid | 4% color<br>0.2% "Katanol W" | 4% color |

Each of the dyeings is then printed with the discharge paste employed in Example 2, aged for five minutes at 102°, washed and dried. As in the case of Example 2, the discharges obtained on the goods dyed with dyestuffs to which tannic acid or "Katanol W" has been added are superior to those obtained with dyestuffs to which neither tannic acid nor "Katanol W" has been added.

*Example 8.*—Three sets of dye baths are made up according to formulas N, O, and P of above Example 7 with each of the dyestuffs Erie Fast Orange CG (C. I. No. 621) and Erie Yellow S2G. Cotton is dyed therewith as in Example 7. The dyeings obtained with the dyestuffs to which tannic acid or "Katanol W" has been added are brighter than those obtained with dyestuffs to which neither tannic acid nor "Katanol W" has been added. These dyestuffs are not employed for discharging, inasmuch as they do not lead to a white discharge.

*Example 9.*—Three dye baths are made up according to the following formula:

Per cent
Diazine Scarlet R (C. I. No. 324a) _____ 4
Common salt _____ 30

To one bath, 0.2 per cent tannic acid is added; to another bath, 0.2 per cent "Katanol W" is added. Cotton is dyed therewith at 90° for one hour using a volume of dye bath of 1:30. The dyed material is rinsed in cold water and diazotized for 20 minutes in a cold bath of Per cent
Sodium nitrite _____ 3
Sulfuric acid (66° Bé.) _____ 5 having a volume of 1:30, rinsed well, and developed for 20 minutes in a cold bath of 1% beta-naphthol, ½% caustic soda (77° Tw.) having a volume of 1:30, rinsed and dried.

Discharge prints of each of the dyeings are then produced as in Example 2. As in the case of Example 2, the discharges obtained on the material dyed in the dye baths containing tannic acid or "Katanol W" are purer white than those obtained from the dye bath to which neither tannic acid nor "Katanol W" has been added.

*Example 10.*—Three dye baths are made up according to the following formula:

|  | Per cent |
|---|---|
| Diazine Scarlet R (C. I. No. 324a) | 4 |
| Common salt | 20 |

To one bath, 0.2% of tannic acid is added; to another, 0.2% "Katanol W" is added. Rayon is dyed therewith, developed, and discharge printed in the manner described in Example 5. The discharges obtained from the dyeings produced with the dye baths containing tannic acid or "Katanol W" are purer white than that obtained with the bath to which neither tannic acid nor "Katanol W" has been added.

*Example 11.*—Three sets of dye baths are made up according to the following formulas R, S, and T with each of the dyestuffs:

Milling Orange G
Erie Scarlet B
Erie Fast Brown 3RB
Solantine Red 8BL

Pure silk is dyed with this formula at 85° for one hour using a volume of dye bath of 1:40.

| R | S | T |
|---|---|---|
| 4% dyestuff<br>15% Glauber's salt<br>3% acetic acid (28% strength)<br>0.2% tannic acid | 4% dyestuff<br>15% Glauber's salt<br>3% acetic acid (28% strength)<br>0.2% "Katanol W" | 4% dyestuff<br>15% Glauber's salt<br>3% acetic acid (28% strength) |

Each of the dyeings is discharge printed in the manner described in Example 2. As in Example 2 the white discharges obtained on the goods dyed with dyestuffs to which tannic acid or "Katanol W" has been added are superior to those obtained with dyestuffs to which neither tannic acid nor "Katanol W" has been added.

*Example 12.*—Three sets of dye baths are made up according to the following formulas U, V, and W with Erie Black GX00

Cotton is dyed therewith at 90° for 1 hour using a volume of dye bath of 1:30.

| U | V | W |
|---|---|---|
| 6% dyestuff<br>2% soda ash<br>40% common salt<br>0.3% tannic acid | 6% dyestuff<br>2% soda ash<br>40% common salt<br>0.3% "Katanol W" | 6% dyestuff<br>2% soda ash<br>40% common salt |

Each of the dyeings is then printed with the discharge paste employed in Example 2, aged for 5 minutes at 102°, washed and dried. As in the case of Example 2, the discharges obtained on the material dyed in the dyebaths containing tannic acid or "Katanol W" are superior to those obtained from the dye bath to which neither tannic acid nor "Katanol W" has been added.

Since changes may be made in carrying out the above method without departing from the scope of the invention, it is intended that all matter contained in the above description shall be interpreted as illustrative and not in a limiting sense.

I claim:

1. A method of improving the dyeing properties of a dischargeable azo dyestuff giving white discharges on reduction and containing, as a result of the manufacture of the dyestuff, impurities which stain materials dyed therewith, which comprises incorporating with the dyestuff a basic dye mordant in an amount not exceeding 20 per cent of the weight of the dyestuff, prior to application of the dyestuff to the fiber.

2. A method of improving the dyeing properties of a dischargeable azo dyestuff giving white discharges on reduction and containing, as a result of the manufacture of the dyestuff, impurities which stain materials dyed therewith, which comprises mixing a basic dye mordant with an aqueous solution of the dyestuff, the amount of basic dye mordant not exceeding 20 per cent of the weight of the dyestuff.

3. A method of improving the dyeing properties of a dischargeable azo dyestuff giving white discharges on reduction and containing, as a result of the manufacture of the dyestuff, impurities which stain materials dyed therewith, which comprises mixing a basic dye mordant with the dyestuff in solid form, the amount of basic dye mordant not exceeding 20 per cent of the weight of the dyestuff.

4. A method of improving the dyeing properties of a dischargeable azo dyestuff giving white discharges on reduction and containing, as a result of the manufacture of the dyestuff, impurities which stain materials dyed therewith, which comprises precipitating impurities from an aqueous solution of the dyestuff by incorporating into the solution a basic dye mordant in an amount not exceeding 20 per cent of the weight of the dyestuff, and separating the resulting precipitate from the solution of the dyestuff.

5. A method of improving the dyeing properties of a dischargeable azo dyestuff giving white discharges on reduction and containing, as a result of the manufacture of the dyestuff, impurities which stain materials dyed therewith, which comprises treating the dyestuff with a basic dye mordant in an amount corresponding with 5 to 15 per cent of the weight of the dyestuff, prior to application of the dyestuff to the fiber.

6. A method of improving the dyeing properties of a dischargeable azo dyestuff giving white discharges on reduction and containing, as a result of the manufacture of the dyestuff, impurities which stain materials dyed therewith, which comprises precipitating impurities from an aqueous solution of the dyestuff with the aid of tannic acid, the amount of tannic acid not exceeding 20 per cent of the weight of the dyestuff.

7. A method of improving the dyeing properties of a dischargeable azo dyestuff giving white discharges on reduction and containing, as a result of the manufacture of the dyestuff, impurities which stain materials dyed therewith, which comprises precipitating impurities from an aqueous solution of the dyestuff with the aid of a "Katanol," the amount of "Katanol" not exceeding 20 per cent of the weight of the dyestuff.

8. A method of improving the dyeing properties of a dischargeable azo dyestuff giving white discharges on reduction and containing, as a result of the manufacture of the dyestuff, impurities which stain materials dyed therewith, which comprises mixing the dyestuff with an amount of tannic acid corresponding with 5 to 15 per cent of the weight of the dyestuff.

9. A method of improving the dyeing properties of a dischargeable azo dyestuff giving white discharges on reduction and containing, as a result of the manufacture of the dyestuff, impurities which stain materials dyed therewith, which comprises mixing the dyestuff with an amount of a "Katanol" corresponding with 5 to 15 per cent of the weight of the dyestuff, prior to application of the dyestuff to the fiber.

10. A method of improving the dyeing properties of a dischargeable azo dyestuff giving white discharges on reduction and containing, as a result of the manufacture of the dyestuff, impurities which stain materials dyed therewith thereby discoloring discharges of said dyestuff, which comprises adding to an aqueous solution of the dyestuff tannic acid in an amount corresponding with 5 to 15 per cent of the weight of the dyestuff, filtering the solution of the dyestuff from the resulting precipitate, and recovering the dyestuff from the resulting solution.

11. A method of improving the dyeing properties of a dischargeable azo dyestuff giving white discharges on reduction and containing, as a result of the manufacture of the dyestuff, impurities which stain materials dyed therewith thereby discoloring discharges of said dyestuff, which comprises adding to an aqueous solution of the dyestuff a "Katanol" in an amount corresponding with 5 to 15 per cent of the weight of the dyestuff, filtering the solution of the dyestuff from the resulting precipitate, and recovering the dyestuff from the resulting solution.

12. A dyestuff composition comprising a dischargeable azo dyestuff giving white discharges on reduction and containing, as a result of the manufacture of the dyestuff, impurities which stain materials dyed therewith, and a basic dye mordant in an amount not exceeding 20 per cent of the weight of the dyestuff.

13. A dyestuff composition comprising a dischargeable azo dyestuff giving white discharges on reduction and containing, as a result of the manufacture of the dyestuff, impurities which stain materials dyed therewith, and tannic acid in an amount not exceeding 20 per cent of the weight of the dyestuff.

14. A dyestuff composition comprising a dischargeable azo dyestuff giving white discharges on reduction and containing, as a result of the manufacture of the dyestuff, impurities which stain materials dyed therewith and a "Katanol" in an amount not exceeding 20 per cent of the weight of the dyestuff.

15. A dyestuff composition in solid form comprising a dischargeable azo dyestuff giving white discharges on reduction and containing, as a result of the manufacture of the dyestuff, impurities which stain materials dyed therewith, and in admixture therewith a basic dye mordant in an amount corresponding with 5 to 15 per cent of the weight of the dyestuff.

16. A dyestuff composition in solid form comprising a dischargeable azo dyestuff giving white discharges on reduction and containing, as a result of the manufacture of the dyestuff, impurities which stain materials dyed therewith, and in admixture therewith tannic acid in an amount corresponding with 5 to 15 per cent of the weight of the dyestuff.

17. A dyestuff composition in solid form comprising a dischargeable azo dyestuff giving white discharges on reduction and containing, as a result of the manufacture of the dyestuff, impurities which stain materials dyed therewith, and in admixture therewith a "Katanol" in an amount corresponding with 5 to 15 per cent of the weight of the dyestuff.

FRANK W. GAINEY.

CERTIFICATE OF CORRECTION.

Patent No. 2,354,588.  July 25, 1944.

FRANK W. GAINEY.

It is hereby certified that error appears in the printed specification of the above numbered patent requiring correction as follows: Page 1, second column, line 1, for "Patent 358,530" read --Patent 348,530--; and that the said Letters Patent should be read with this correction therein that the same may conform to the record of the case in the Patent Office.

Signed and sealed this 24th day of October, A. D. 1944.

Leslie Frazer (Seal)  Acting Commissioner of Patents.